US011542867B2

(12) United States Patent
Tan et al.

(10) Patent No.: US 11,542,867 B2
(45) Date of Patent: Jan. 3, 2023

(54) SUPERSONIC AIR INTAKE PASSAGE CAPABLE OF ACHIEVING SYNCHRONOUS ADJUSTMENT OF CAPTURING AREA AND THROAT AREA

(71) Applicant: NANJING UNIVERSITY OF AERONAUTICS AND ASTRONAUTICS, Jiangsu (CN)

(72) Inventors: Huijun Tan, Jiangsu (CN); Yazhou Liu, Jiangsu (CN); Fajia Sheng, Jiangsu (CN); Ziyun Wang, Jiangsu (CN); Hexia Huang, Jiangsu (CN); Yue Zhang, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 403 days.

(21) Appl. No.: 16/652,074

(22) PCT Filed: Aug. 14, 2018

(86) PCT No.: PCT/CN2018/100401
§ 371 (c)(1),
(2) Date: May 18, 2020

(87) PCT Pub. No.: WO2019/062361
PCT Pub. Date: Apr. 4, 2019

(65) Prior Publication Data
US 2020/0309030 A1    Oct. 1, 2020

(30) Foreign Application Priority Data

Sep. 29, 2017   (CN) .................. CN201710906033

(51) Int. Cl.
*F02C 7/057*    (2006.01)
*B64C 1/38*     (2006.01)
(Continued)

(52) U.S. Cl.
CPC .............. *F02C 7/057* (2013.01); *B64C 1/38* (2013.01); *F02C 7/00* (2013.01); *F02K 1/165* (2013.01)

(58) Field of Classification Search
CPC .. F02C 7/057; F02C 7/042; F02C 7/04; F02C 7/00; F02K 1/165; B64D 1/38; B64D 2033/026; B64D 33/02; B64C 1/38
See application file for complete search history.

(56) References Cited

U.S. PATENT DOCUMENTS 3,067,573 A * 12/1962 Connors ................. F02C 7/042
138/46
3,067,578 A * 12/1962 Donald ................... F02C 7/057
138/45
(Continued)

FOREIGN PATENT DOCUMENTS

CN    103790710    5/2014
CN    104632411    5/2015
(Continued)

*Primary Examiner* — Thomas P Burke
(74) *Attorney, Agent, or Firm* — JCIP Global Inc.

(57) ABSTRACT

The present invention discloses a supersonic inlet with synchronous adjustment of capture area and throat area, wherein the throat area may be adjusted by providing a movable throat section, while the capture area may be adjusted by providing a movable cowl section at the front end of the cowl lip, thereby realizing the effect that the capture area and the throat area of the inlet may be adjusted in synchronization. Meanwhile, the present invention also provides a control method and a design method of the above-mentioned inlet. The present invention greatly simplifies the actuation system and control system, significantly reduces the weight of the accessory system, and enables the performance of the inlet within a wide envelope range to be maintained in an excellent state.

8 Claims, 4 Drawing Sheets

(51) Int. Cl.
    *F02C 7/00*          (2006.01)
    *F02K 1/16*          (2006.01)

(56) References Cited

U.S. PATENT DOCUMENTS

| | | | | |
|---|---|---|---|---|
| 3,265,331 | A | * | 8/1966 | Miles ............... F02C 7/042 244/53 B |
| 3,295,555 | A | * | 1/1967 | James ............... F02C 7/042 138/45 |
| 3,456,664 | A | * | 7/1969 | Foote ............... F02C 7/042 138/45 |
| 5,026,004 | A | * | 6/1991 | Dobie ............... B64D 33/02 244/53 B |
| 5,116,251 | A | * | 5/1992 | Bichler ............. B64D 33/02 60/768 |
| 5,301,901 | A | * | 4/1994 | Kutschenreuter, Jr. ............ B64D 33/02 137/15.1 |
| 2004/0144077 | A1 | * | 7/2004 | Kobayashi ......... B64D 33/02 60/39.48 |

FOREIGN PATENT DOCUMENTS

| | | |
|---|---|---|
| CN | 107575309 | 1/2018 |
| CN | 107605601 | 1/2018 |
| EP | 0358347 | 3/1990 |

* cited by examiner

SUPERSONIC AIR INTAKE PASSAGE CAPABLE OF ACHIEVING SYNCHRONOUS ADJUSTMENT OF CAPTURING AREA AND THROAT AREA

CROSS-REFERENCE TO RELATED APPLICATION

This application is a 371 of international application of PCT application serial no. PCT/CN2018/100401, filed on Aug. 14, 2018, which claims the priority benefit of China application no. 201710906033.6, filed on Sep. 29, 2017. The entirety of each of the above mentioned patent applications is hereby incorporated by reference herein and made a part of this specification.

BACKGROUND

Technical Field

The present invention relates to the field of aircraft design, and in particular to an engine inlet.

Description of Related Art

One of the main functions of an inlet, as one of the main components of a suction propulsion system, is to provide required air flow to an engine. Only when the inlet and the engine cooperate with each other can the propulsion system work efficiently.

The flow matching of the inlet and the engine should be satisfied not only in the design state, but also in the non-design state as much as possible. For a supersonic aircraft, from take-off to supersonic cruise and flight at maximum speed, the flight Mach number and flight altitude vary widely, and the operating state of the engine also varies widely, resulting in a significant variation in the flow required by the engine. However, traditional geometrically fixed supersonic inlets have certain limitation on the capture of air flow. Therefore, the air flow that may be provided by the supersonic inlet is often inconsistent with the air flow required by the engine, and this contradiction is relatively prominent, leading to the deterioration of the performance of the power device.

For a supersonic aircraft, the maximum flight Mach number is generally selected as the design state to ensure that there is sufficient thrust to meet the requirements of flight at maximum speed. When the flight Mach number is less than the design Mach number, i.e. $M_0=M_D$, the captured flow of the inlet is generally less than the required flow of the engine, the relationship between the supply and demand flow coefficients is $\phi_{supply}<\phi_{demand}$, ($\phi$ is the flow efficient), the inlet is working in a supercritical state, and the terminal shock wave behind the throat becomes stronger, leading to a reduction in the total pressure recovery coefficient and an increase in the distortion of the exit flow field, which may even cause itching. Moreover, when the flight Mach number $M_0$ decreases, the throat area $A_{t,d}$ a determined according to the design state appears to be too small, resulting in throat congestion and the formation of bow shock wave in front of the entrance of the inlet, which further reduces $\phi_{supply}$ and exacerbates the supercritical degree of the inlet.

In order to ensure the matching between the inlet and the engine and the performance level of the power device, when $M_0<M_D$, since $\phi_{supply}<\phi_{demand}$, the captured flow of the inlet is less than the required flow of the engine, the inlet needs to be adjusted to increase the capture area $A_0$ and the flow coefficient $\phi_{supply}$, and the throat area $A_t$ is enlarged accordingly.

The invention patent CN 104632411 A discloses an "internal multiplication wave type turbine-based combined power inlet in a binary geometrically variable form", wherein the throat area is changed by driving the upper wall of the throat section, and the internal contraction ratio is further changed, thereby ensuring the compression performance of the inlet, whereas the single adjustment of the throat area does not guarantee the flow demand of the engine under different operating conditions; the invention patent CN 102705081 A proposes a "binary hypersonic geometrically variable inlet and design method and working method thereof", wherein the capture area is changed by the horizontal movement of the cowl lip, thereby realizing the adjustment of the internal contraction ratio at high and low Mach numbers and the flow adjustment under different incoming flow conditions, whereas the throat area is not adjusted, which is likely to cause throat congestion and cannot guarantee the compression ratio of the inlet.

It can be seen that all of the existing geometrically variable solutions focus on the individual adjustment of the throat area $A_t$ or the capture area $A_0$, which cannot guarantee the synchronous adjustment of the capture area and the throat area and have relatively low adjustment efficiency. Therefore, there is a need to design a supersonic inlet in which the capture area and the throat area may be adjusted in synchronization, so as to ensure that the captured flow of the inlet and the required flow of the engine are matched and that throat congestion would not occur.

SUMMARY OF THE INVENTION

In order to overcome the above-mentioned problems, the present invention provides a technical solution of an inlet with synchronous adjustment of capture area and throat area of a supersonic inlet.

The present invention also provides a technical solution of a control method of the above-mentioned inlet.

The present invention also provides a technical solution of a design method of the above-mentioned inlet.

In order to achieve the above-mentioned objects, the technical solution used by the supersonic inlet of the present invention in which the capture area and the throat area may be adjusted in synchronization is as follows:

A supersonic inlet with synchronous adjustment of capture area and throat area comprises a first stage compression surface located on the inner side of the entrance of the inlet, a second stage compression surface extending backward from the first stage compression surface, a cowl lip located on the outer side of the entrance of the inlet, a movable inner contraction section hinged on the rear end of the second stage compression surface and extending backward, a movable throat section hinged on the rear end of the movable inner contraction section and extending backward, and a movable diffuser section hinged on the rear end of the movable throat section and extending backward; the cowl lip comprises a fixed cowl section located on the rear end and a rotatable cowl section hinged on the front end of the fixed cowl section and extending forward, the rotatable cowl section may rotate inward or outward around its hinge point with the fixed cowl section.

Beneficial effects are: in a supersonic inlet provided by the present invention in which the capture area and the throat area may be adjusted in synchronization, the throat area may be adjusted by providing a movable throat section, while the capture area may be adjusted by providing a movable cowl section at the front end of the cowl lip, thereby realizing the effect that the capture area and the throat area of the inlet may be adjusted in synchronization.

Further, on the basis of the above-mentioned supersonic inlet, the present invention proposes additional technical characteristics capable of realizing the synchronous adjustment of the capture area and the throat area of the supersonic inlet by the same driving device:

the inner side of the movable throat section is hinged to one end of at least one rotatable arm, and the other end of the rotatable arm is hinged to a push rod located on the inner side of the movable throat section and extending forward and backward, the rear end of the push rod is connected to a driving device; provided are also an inclined sliding groove connected to the front end of the push rod, and a cowl lip support rod connecting the inclined sliding groove and the rotatable cowl section, the inclined sliding groove comprises a first horizontal groove, a second horizontal groove, and an inclined groove in communication with the first horizontal groove and the second horizontal groove, the first horizontal groove is connected to the push rod, and the first horizontal groove is more outward than the second horizontal groove; one end of the cowl lip support rod is provided with a slider located in the inclined sliding groove, and the other end of the cowl lip support rod is connected to the rotatable cowl section; the front end of the inclined sliding groove is limited in a guide rail groove by a guide rail;

during the forward sliding of the push rod driven by the driving device, the push rod drives the movable throat section through the rotatable arm to be pulled back from the outermost arched position, that is, the throat area of the inlet is changed from the minimum to the maximum; the push rod slides forward while pushing the inclined sliding groove to move forward, such that the slider moves towards the end of the inclined sliding groove connected to the push rod, thereby causing the cowl lip support rod to push outward to rotate the rotatable cowl section outward around its hinge point with the fixed cowl section, in this process, the rotatable cowl section does not rotate when the slider of the cowl lip support rod moves in the first horizontal groove and the second horizontal groove;

during the backward sliding of the push rod from the foremost position driven by the driving device, the push rod drives the movable throat section through the rotatable arm to arch outward, and when the push rod slides to the final position, the movable throat section is located at the outermost arched position, at this time, the rotatable arm and the push rod are perpendicular to each other; the push rod slides backward while pulling the inclined sliding groove to move backward, such that the slider moves towards the front end of the inclined sliding groove, thereby causing the cowl lip support rod to pull inward to rotate the rotatable cowl section inward around its hinge point with the fixed cowl section, in this process, the rotatable cowl section does not rotate when the slider of the cowl lip support rod moves in the first horizontal groove and the second horizontal groove.

In the above-mentioned additional technical characteristics, an inclined sliding groove is designed on the left side of the horizontal push rod of the throat area adjustment system, so that the slider connected to the rotatable cowl lip support rod makes relative movement in the inclined sliding groove. When the horizontal push rod is driven to move left and right, not only the movement of the lower wall of the throat can be driven to adjust the throat area, but also the rotation of the cowl lip can be driven by the up and down movement of the slider via the inclined sliding groove to adjust the capture area, thereby realizing the synchronous adjustment of the capture area and the throat area of a supersonic inlet by using the same set of driving mechanisms. The design of the geometry of the inclined sliding groove (the geometry including two horizontal grooves and a middle inclined groove, as described above), on the basis of the adjustment law of the throat area and the capture area determined respectively by the working envelope of the aircraft and the flow variation law of the engine within the flight envelope, can realize the synchronous adjustment of the capture area and the throat area according to a certain actuation law.

Further, provided is also a limiting groove configured for limiting the cowl lip support rod, the limiting groove extends from the inside to the outside. The provision of this limiting groove makes the cowl lip support rod only move inward or outward, so that the displacement data of the cowl lip support rod is uniquely linear when the cowl lip support rod drives the rotatable cowl section to rotate, which makes it easier to collect and process data.

Further, the rear end of the movable diffuser section is connected to a translation section, the front end of the translation section is hinged to the rear end of the movable diffuser section, and the rear end of the translation section is limited by a translation limiting groove extending forward and backward.

Further, a cowl lip sliding groove is provided on the inner side of the rotatable cowl section, and the end of the cowl lip support rod connected to the rotatable cowl section is provided with a cowl lip slider located in the cowl lip sliding groove. The cowl lip sliding groove gives the cowl lip slider a space to move, and since the cowl lip support rod can only move inward or outward, the space for the movement of the cowl lip slider inside the cowl lip sliding groove can avoid interference with the movement of the cowl lip support rod during the rotation of the rotatable cowl section.

The control method of the above-mentioned inlet provided by the present invention may adopt the following technical solution:

(1.1) when a flight Mach number is low subsonic speed, the push rod is pushed to the foremost position, and the rotatable cowl section is pushed outward by the cowl lip support rod to the maximum outward corner position, the capture area is the maximum, and the throat area is the maximum;

(1.2) when accelerating to the inlet start Mach number, the push rod slides backward, and the movable throat section deforms to arch outward, causing the throat area to be reduced, whereas the slider slides in the first horizontal groove and the cowl lip does not rotate, the capture area still remains the maximum, while the compression capacity of the inlet is increased due to the reduction of the throat area;

(1.3) during the acceleration process from the start of the inlet to the cruise, the push rod slides backward, the slider slides in the inclined groove and pulls the rotatable cowl section to rotate inward, and the movable throat section deforms to arch outward to the outermost arched position; the capture area and the throat area are reduced in synchronization;

(1.4) when the aircraft is flying at the maximum Mach number, the push rod is located at the rightmost end, and both the capture area and the throat area are the minimum.

(1.5) during the flight, when the required flow of the engine is less than the captured flow of the inlet, the push rod is moved backward; and when the required flow of the engine is larger than the captured flow of the inlet, the push rod is moved forward.

The design method of the above-mentioned inlet provided by the present invention may adopt the following technical solution:

(2.1) the profile face of the inlet is designed with a cruise point as a design Mach number, and this profile face is used as the basis for the variable geometry of the inlet;

(2.2) in the design of a cowl lip hinge point, since the cowl lip is required to be rotated to adjust the capture area of the inlet, and at the same time in order to avoid the generation of additional shock waves, a cowl lip turning point is selected as the hinge point;

(2.3) in the design of a cowl lip support rod hinge point, considering issues such as driving force and support strength, the cowl lip support rod hinge point is set as the midpoint between a lip opening point and the cowl lip hinge point.

Further, the profile face of the sliding groove is generated by using motion simulation software: after the introduction of the geometry configuration of the inlet and the completion of the setting of corresponding motion pairs, first, by using the throat area adjustment law and the capture area adjustment law as driving functions, respectively, the responsive displacement x of the push rod and the responsive displacement y of the cowl lip support rod are obtained through the motion simulation of an actuation mechanism, and the center profile line of the sliding groove is then fitted through configuration software based on the point cloud (x, y).

DESCRIPTION OF THE EMBODIMENTS

Figure 1:
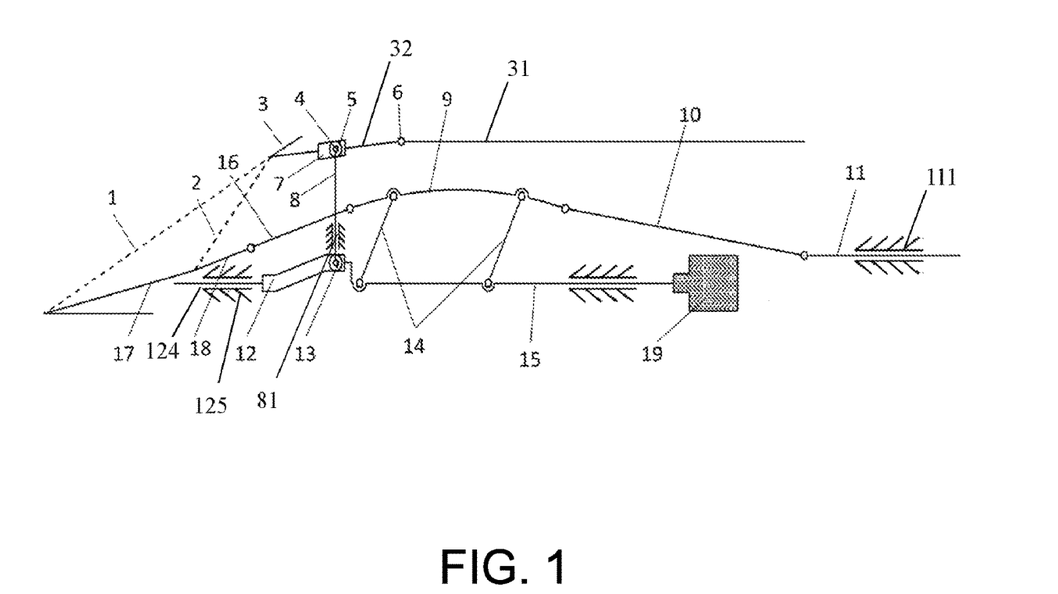
FIG. 1 is a schematic structural diagram of a supersonic inlet according to the present invention.
Figure 2:
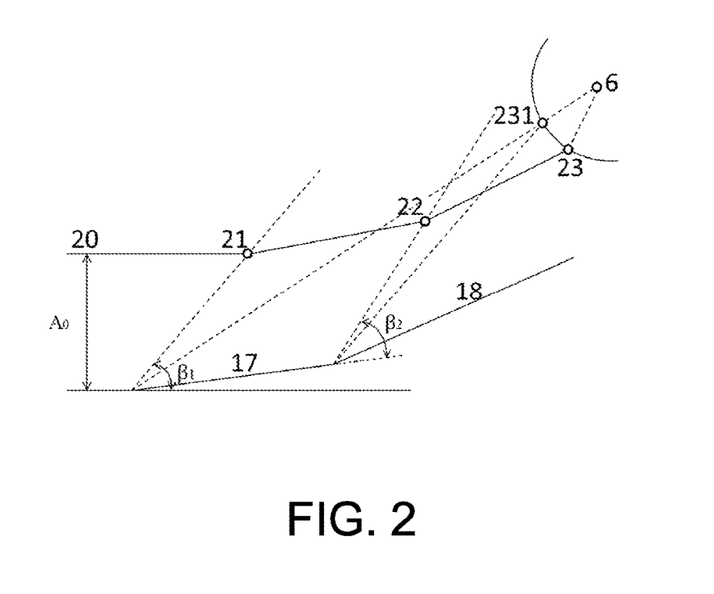
FIG. 2 is a schematic diagram of the lip opening position of the supersonic inlet according to the present invention.
Figure 3:
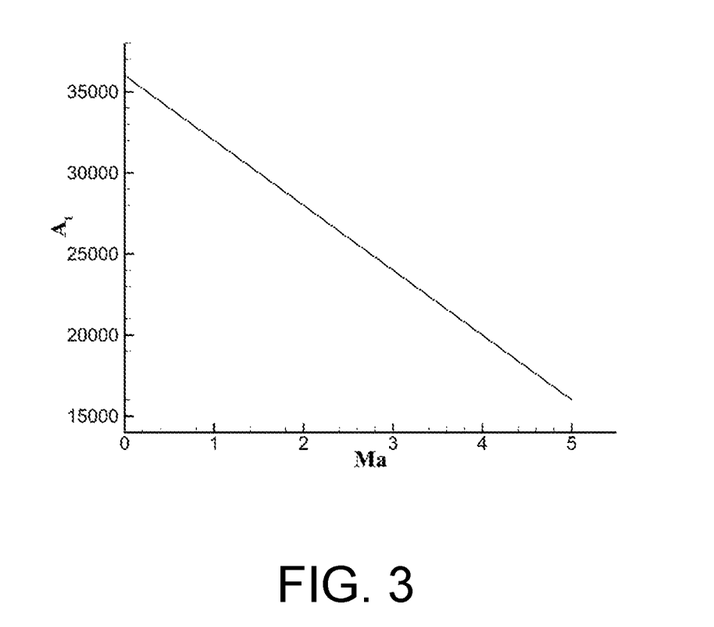
FIG. 3 shows the variation law of a certain throat area with the flying Mach number.
Figure 5:
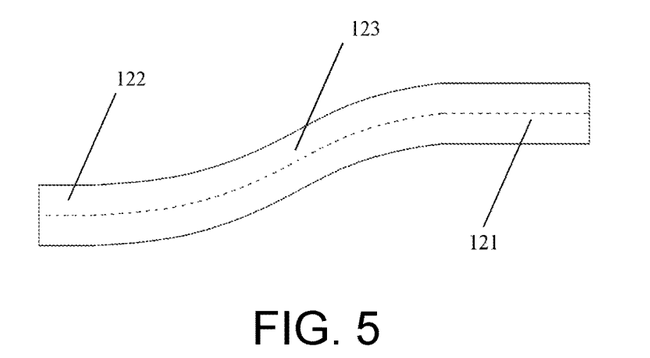
FIG. 5 shows the profile face of the inclined sliding groove in the inlet according to the present invention.

Please refer to FIGS. 1, 2 and 5, the present invention discloses a supersonic inlet with synchronous adjustment of capture area and throat area comprising a first stage compression surface 17 located on the inner side of the entrance of the inlet, a second stage compression surface 18 extending backward from the first stage compression surface, a cowl lip 3 located on the outer side of the entrance of the inlet, a movable inner contraction section 16 hinged on the rear end of the second stage compression surface 18 and extending backward, a movable throat section 9 hinged on the rear end of the movable inner contraction section 16 and extending backward, and a movable diffuser section 10 hinged on the rear end of the movable throat section 9 and extending backward; the cowl lip 3 comprises a fixed cowl section 31 located on the rear end and a rotatable cowl section 32 hinged on the front end of the fixed cowl section and extending forward, the rotatable cowl section 32 may rotate inward or outward around its hinge point with the fixed cowl section. Provided is also a limiting groove 81 configured for limiting the cowl lip support rod 8, the limiting groove 81 extends from the inside to the outside. The rear end of the movable diffuser section 10 is connected to a translation section 11, the front end of the translation section is hinged to the rear end of the movable diffuser section 10, and the rear end of the translation section is limited by a translation limiting groove 111 extending forward and backward. A cowl lip sliding groove 7 is provided on the inner side of the rotatable cowl section 32, and the end of the cowl lip support rod connected to the rotatable cowl section is provided with a cowl lip slider located in the cowl lip sliding groove.

the inner side of the movable throat section 9 is hinged to one end of at least one rotatable arm 14, and the other end of the rotatable arm 14 is hinged to a push rod 15 located on the inner side of the movable throat section and extending forward and backward, the rear end of the push rod 15 is connected to a driving device 19; provided are also an inclined sliding groove 12 connected to the front end of the push rod, and a cowl lip support rod 8 connecting the inclined sliding groove and the rotatable cowl section, the inclined sliding groove comprises a first horizontal groove 121, a second horizontal groove 122, and an inclined groove 123 in communication with the first horizontal groove 121 and the second horizontal groove 122, the first horizontal groove is connected to the push rod 15, and the first horizontal groove is more outward than the second horizontal groove; one end of the cowl lip support rod 8 is provided with a slider 13 located in the inclined sliding groove, and the other end of the cowl lip support rod is connected to the rotatable cowl section 32; the front end of the inclined sliding groove is limited in a guide rail groove 125 by a guide rail 124;

during the forward sliding of the push rod 15 driven by the driving device 19, the push rod 15 drives the movable throat section 9 through the rotatable arm 14 to be pulled back from the outermost arched position, that is, the throat area of the inlet is changed from the minimum to the maximum; the push rod 15 slides forward while pushing the inclined sliding groove 12 to move forward, such that the slider 13 moves towards the end of the inclined sliding groove 12 that is connected to the push rod 15, thereby causing the cowl lip support rod 8 to push outward to rotate the rotatable cowl section 32 outward around its hinge point with the fixed cowl section, in this process, the rotatable cowl section 32 does not rotate when the slider of the cowl lip support rod moves in the first horizontal groove and the second horizontal groove;

during the backward sliding of the push rod 15 from the foremost position driven by the driving device 19, the push rod 15 drives the movable throat section 9 through the rotatable arm 14 to arch outward, and when the push rod 15 slides to the final position, the movable throat section 9 is located at the outermost arched position, at this time, the rotatable arm and the push rod are perpendicular to each other; the push rod 15 slides backward while pulling the inclined sliding groove 12 to move backward, such that the slider 13 moves towards the front end of the inclined sliding groove 12, thereby causing the cowl lip support rod 8 to pull inward to rotate the rotatable cowl section 32 inward around its hinge point with the fixed cowl section, in this process, the rotatable cowl section 32 does not rotate when the slider of the cowl lip support rod moves in the first horizontal groove and the second horizontal groove.

Figure 7:
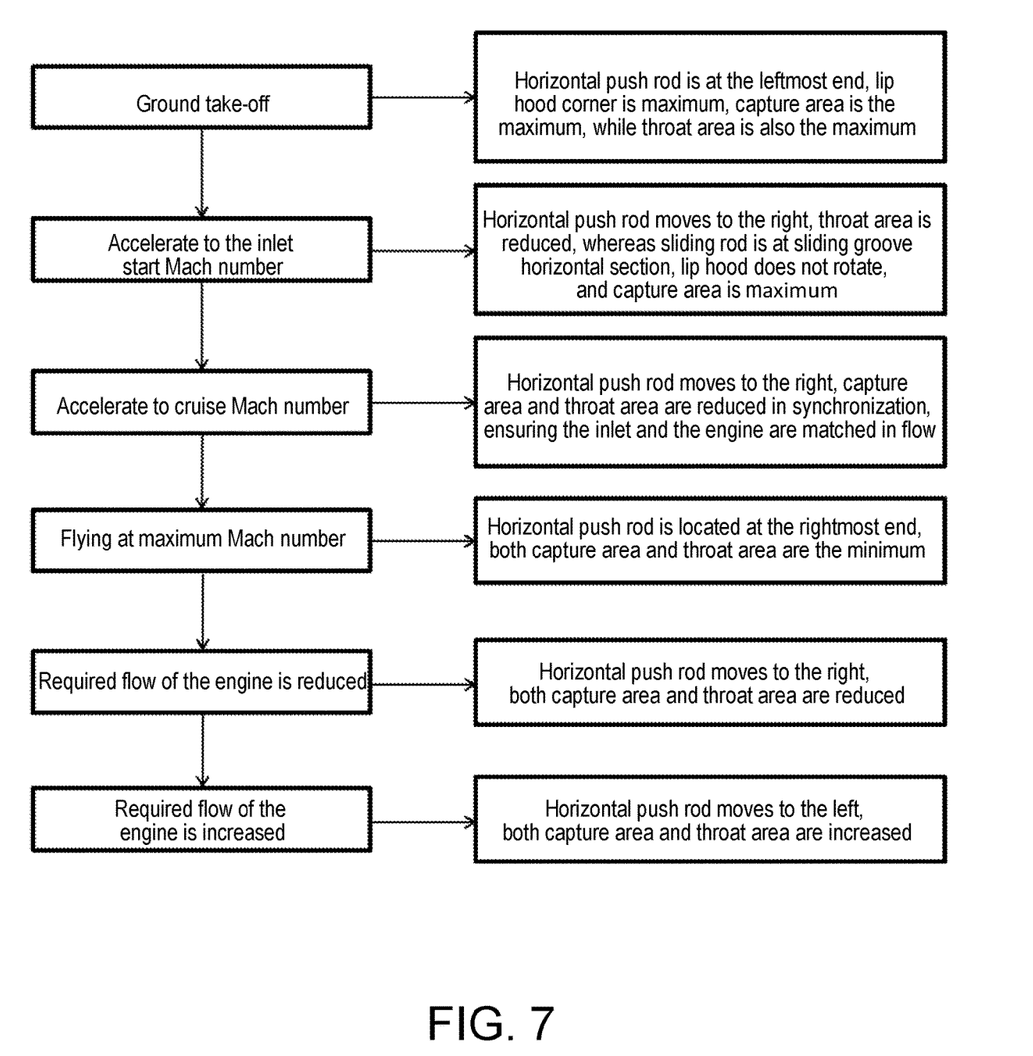
FIG. 7 is a working flow chart of the supersonic inlet according to the present invention.

Please refer to FIG. 7, an example of a control method of the above-mentioned supersonic inlet is as follows:

1.1. When a flight Mach number is low subsonic speed, the push rod 15 is pushed to the foremost position, and the rotatable cowl section 32 is pushed outward by the cowl lip support rod 8 to the maximum outward corner position, the capture area is the maximum, and the throat area is the maximum, thus ensuring that the inlet has a relatively large captured flow, and ensuring the requirements for thrust during takeoff or landing.

1.2. When accelerating to the inlet start Mach number, the push rod 15 slides backward, and the movable throat section 9 deforms to arch outward, causing the throat area to be reduced, whereas the slider 13 slides in the first horizontal groove 121 and the cowl lip 3 does not rotate, the capture area still remains the maximum, while the compression capacity of the inlet is increased due to the reduction of the throat area, and inflow performance is improved.

1.3. during the acceleration process from the start of the inlet to the cruise, the push rod 15 slides backward, the slider 13 slides in the inclined groove 123 and pulls the rotatable cowl section 32 to rotate inward, and the movable throat section 9 deforms to arch outward to the outermost arched position; the capture area and the throat area are reduced in synchronization; thereby ensuring that the flow coefficient of the inlet is always maintained at a relatively high level while having a relatively high compression capacity.

1.4. When the aircraft is flying at the maximum Mach number, the push rod 15 is located at the rightmost end, and both the capture area and the throat area are the minimum.

1.5. During the flight, when the required flow of the engine is less than the captured flow of the inlet, the push rod 12 is moved backward; and when the required flow of the engine is larger than the captured flow of the inlet, the push rod 12 is moved forward.

Figure 6:
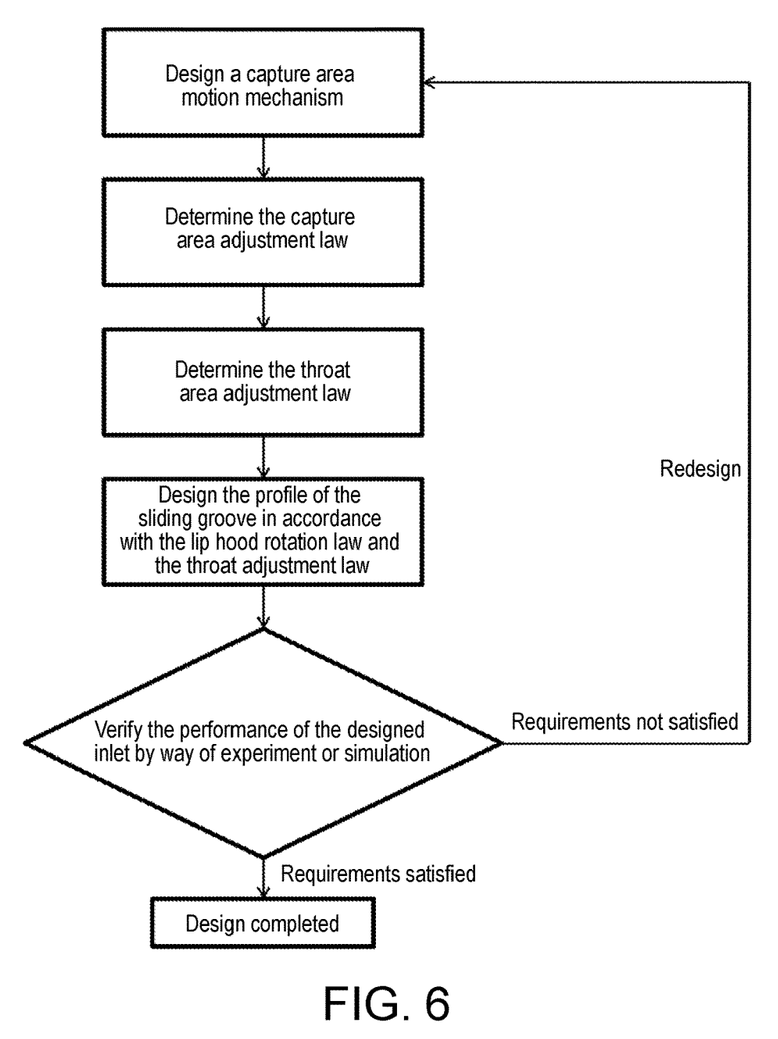
FIG. 6 is a design flow chart of the supersonic inlet according to the present invention.

Please refer to FIGS. 5 and 6, a design method of a supersonic inlet according to the present invention comprises:

the design of the capture area adjustment mechanism:

2.1. with reference to the design method of a geometrically fixed inlet in the prior art, such as the design method of a geometrically fixed inlet in the invention patent CN201710413366.5, the profile face of the inlet is designed with a cruise point as a design Mach number, and this profile face is used as the basis for the variable geometry of the inlet;

2.2. in the design of a cowl lip hinge point 6, since the cowl lip is required to be rotated to adjust the capture area of the inlet, and at the same time in order to avoid the generation of additional shock waves, a cowl lip turning point is selected as the hinge point;

2.3. in the design of a cowl lip support rod hinge point 4, considering issues such as driving force and support strength, the cowl lip support rod hinge point 4 is set as the midpoint between a lip opening point and the cowl lip hinge point 6.

Determination of the adjustment law of the capture area:

(1) according to the engine's demand within the flight envelope range, the required capture area under the current flight state $(M_0, p_0, T_0, G_{np,e})$ is calculated by $$A_0 = \left(\frac{G_{np,e}}{241}\right) \bigg/ \left(p_0 M_0 \sqrt{k/RT_0}\right),$$

wherein $p_0$ and $T_0$ are the atmospheric pressure and temperature at the current flight altitude, $M_0$ is the flight Mach number, and $G_{np,e}$ is the converted flow required by the engine;

(2) according to the relationship of the plane oblique shock wave and the deflection angles of the first and second stage compression surfaces, the shock wave angles $\beta_1$ and $\beta_2$ of the first stage shock wave 1 and the second stage shock wave 2 can be calculated;

(3) draw a circle with the cowl lip hinge point 6 determined in step 1 as the center and the length of the rotatable cowl lip as the radius;

(4) as shown in the schematic diagram of the lip opening position of the supersonic inlet in which the capture area and the throat area may be continuously adjusted in FIG. 2, among which the cowl lip locates at point 231 at cruise state, draw a point 20 in the free flow with a height of $A_0$, draw a horizontal line intersecting the first shock wave 1 at point 21 from this point, draw a line parallel to the first stage compression surface 17 from point 21 that intersects the second shock wave 2 at point 22, and draw a line parallel to the second stage compression surface 18 from point 22 that intersects the circle drawn in step (3) at point 23 which is determined as the lip opening position under the current flight condition;

(5) the rotation angle of the cowl lip is generally small and is not more than 10°. According to the similarity relationship, the displacement variation law in the vertical direction of the cowl lip slider 13 can be approximated:

$$y = \frac{L_1}{L_0}(A_0 - A_{0,min}).$$

Determination of the adjustment law of the throat area:

a four-link mechanism is used as the actuation mechanism, and the two swing rods are parallel, according to the geometric relationship, it can be obtained that the adjustment of the throat area and the displacement variation law of the horizontal push rod in the horizontal direction conform to the following relationship: $x = \sqrt{L^2 - (H-e-A_t)^2} - \sqrt{L^2 - (H-e-A_{t,min})^2}$, wherein L is the swing rod length, H is the distance from the upper wall surface of the channel in the inlet to the horizontal push rod (15), e is the vertical distance from the highest point of the throat profile line to the hinge where the swing rod is connected to the throat section, and At is the throat area.

The realization form of the cowl lip rotation law and the throat motion law:

the design of the profile face of the sliding groove 12: according to the throat area adjustment law, the displacement variation law of the horizontal push rod 15 is obtained: $x = \sqrt{L^2 - (H-e-A_t)^2} - \sqrt{L^2 - (H-e-A_{t,min})^2}$, according to the capture area adjustment law, the vertical displacement variation law of the slider 13 is obtained:

$$y = \frac{L_1}{L_0}(A_0 - A_{0,min}),$$

and again, according to the relationship between the capture area, the throat area and the flight Mach number given by the overall engine design: $A_0 = f(M_0)$ and $A_t = g(M_0)$, can be obtained that $x = \sqrt{L^2 - (H-E-g(M_0))^2} - \sqrt{L^2 - (H-e-A_{t,min})^2}$ and $$y = \frac{L_1}{L_0}(f(M_0) - A_{0,min}),$$

which is a parametric equation for a single variable $M_0$. Based on this parametric equation, the design of the profile face of the sliding groove 12 can ensure the synchronous adjustment of the capture area and throat area of the inlet, so that the required flow of the engine and the captured flow of the inlet are matched.

The design method of the profile face of the inclined sliding groove:

the profile face of the sliding groove is generated by using motion simulation software: after the introduction of the geometry configuration of the inlet and the completion of the setting of corresponding motion pairs, first, by using the throat area adjustment law and the capture area adjustment law as driving functions, respectively, the responsive displacement x of the push rod 15 and the responsive displacement y of the cowl lip support rod 8 are obtained through the motion simulation of the actuation mechanism, and the center profile line of the sliding groove 12 is then fitted through configuration software based on the point cloud (x, y).

Figure 4:
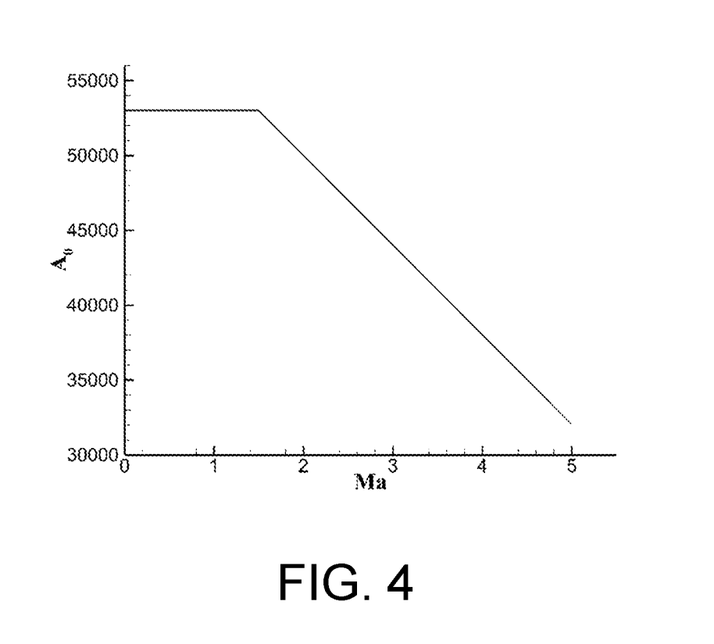
FIG. 4 shows the variation law of a certain capture area with the flying Mach number.

As shown in FIGS. 4 and 5, they are the variation law $A_0=f(M_0)$ and $A_t=g(M_0)$ with the incoming flow Mach number Ma of a certain capture area $A_0$ and throat area $A_t$ as assumed in the present invention, both of which vary linearly. FIG. 6 shows the profile face of the sliding groove generated by using the design method proposed by the present invention based on the variation law shown in FIGS. 4 and 5, at the right end of which there is a horizontal section for ensuring that the throat area varies while the capture area keeps the same during take-off acceleration to the inlet start Mach number.

There are many methods and ways to implement the technical solutions in the present invention, and the above are only the preferred embodiments of the present invention. It should be noted that for those skilled in the art, without departing from the principle of the present invention, several improvements and retouching can be made, and these improvements and retouching should also be regarded as within the protection scope of the present invention. Each component that is not specified in the present example can be implemented by using existing technologies.

What is claimed is:

1. A supersonic inlet with synchronous adjustment of a capture area and a throat area, comprising a first stage compression surface located on an inner side of an entrance of the supersonic inlet, a second stage compression surface extending backward from the first stage compression surface, a cowl lip located on an outer side of the entrance of the supersonic inlet, a movable inner contraction section hinged on a rear end of the second stage compression surface and extending backward, a movable throat section hinged on a rear end of the movable inner contraction section and extending backward, and a movable diffuser section hinged on a rear end of the movable throat section and extending backward; the cowl lip comprises a fixed cowl section located on the rear end and a rotatable cowl section hinged on a front end of the fixed cowl section and extending forward, the rotatable cowl section may rotate inward or outward around a hinge point of the rotatable cowl section with the fixed cowl section, wherein an inner side of the movable throat section is hinged to one end of at least one rotatable arm, and the other end of the at least one rotatable arm is hinged to a push rod located on the inner side of the movable throat section and extending forward and backward, a rear end of the push rod is connected to a driving device; provided are also an inclined sliding groove connected to a front end of the push rod, and a cowl lip support rod connecting the inclined sliding groove and the rotatable cowl section, the inclined sliding groove comprises a first horizontal groove, a second horizontal groove, and an inclined groove in communication with the first horizontal groove and the second horizontal groove, the first horizontal groove is connected to the push rod, and the first horizontal groove is more outward than the second horizontal groove; one end of the cowl lip support rod is provided with a slider located in the inclined sliding groove, and the other end of the cowl lip support rod is connected to the rotatable cowl section; a front end of the inclined sliding groove is limited in a guide rail groove by a guide rail;

during a forward sliding of the push rod driven by the driving device, the push rod drives the movable throat section through the at least one rotatable arm to be pulled back from an outermost arched position, that is, the throat area of the supersonic inlet is changed from a minimum to a maximum; the push rod slides forward while pushing the inclined sliding groove to move forward, such that the slider moves towards an end of the inclined sliding groove that is connected to the push rod, thereby causing the cowl lip support rod to push outward to rotate the rotatable cowl section outward around the hinge point of the rotatable cowl section with the fixed cowl section, in this process, the rotatable cowl section does not rotate when the slider of the cowl lip support rod moves in the first horizontal groove and the second horizontal groove;

during a backward sliding of the push rod from a foremost position driven by the driving device, the push rod drives the movable throat section through the at least one rotatable arm to arch outward, and when the push rod slides to a final position, the movable throat section is located at the outermost arched position, at this time, the at least one rotatable arm and the push rod are perpendicular to each other; the push rod slides backward while pulling the inclined sliding groove to move backward, such that the slider moves towards the front end of the inclined sliding groove, thereby causing the cowl lip support rod to pull inward to rotate the rotatable cowl section inward around the hinge point of the rotatable cowl section with the fixed cowl section, in this process, the rotatable cowl section does not rotate when the slider of the cowl lip support rod moves in the first horizontal groove and the second horizontal groove.

2. The supersonic inlet according to claim 1, wherein provided is also a limiting groove configured for limiting the cowl lip support rod, the limiting groove extends from an inside to an outside.

3. The supersonic inlet according to claim 1, wherein a rear end of the movable diffuser section is connected to a translation section, a front end of the translation section is hinged to the rear end of the movable diffuser section, and a rear end of the translation section is limited by a translation limiting groove extending forward and backward.

4. The supersonic inlet according to claim 1, wherein a cowl lip sliding groove is provided on an inner side of the rotatable cowl section, and an end of the cowl lip support rod connected to the rotatable cowl section is provided with a cowl lip slider located in the cowl lip sliding groove.

5. A control method of the supersonic inlet according to claim 1, comprising:

when a flight Mach number is a low subsonic speed, the push rod is pushed to the foremost position, and the rotatable cowl section is pushed outward by the cowl lip support rod to a maximum outward corner position, the capture area is maximum, and the throat area is maximum;

when accelerating to the supersonic inlet start Mach number, the push rod slides backward, and the movable throat section deforms to arch outward, causing the throat area to be reduced, whereas the slider slides in the first horizontal groove and the cowl lip does not rotate, the capture area still remains the maximum, while a compression capacity of the supersonic inlet is increased due to a reduction of the throat area;

during an acceleration process from a start of the supersonic inlet to a cruise, the push rod slides backward, the slider slides in the inclined sliding groove and pulls the rotatable cowl section to rotate inward, and the movable throat section deforms to arch outward to the outermost arched position; the capture area and the throat area are reduced in synchronization;

when an aircraft is flying at maximum Mach number, the push rod is located at a rightmost end, and both the capture area and the throat area are minimum;

during a flight, when a required flow of an engine is less than a captured flow of the supersonic inlet, the push rod is moved backward; and when the required flow of the engine is larger than the captured flow of the supersonic inlet, the push rod is moved forward.

6. A design method of the supersonic inlet according to claim 1, wherein:

a profile face of the supersonic inlet is designed with a cruise point as a design Mach number, and this profile face is used as a basis for a variable geometry of the supersonic inlet;

in a design of a cowl lip hinge point, since the cowl lip is required to be rotated to adjust the capture area of the supersonic inlet, and at the same time in order to avoid the generation of additional shock waves, a cowl lip turning point is selected as the cowl lip hinge point;

in a design of a cowl lip support rod hinge point, considering issues such as driving force and support strength, the cowl lip support rod hinge point is set as a midpoint between a lip opening point and the cowl lip hinge point.

7. The supersonic inlet according to claim 2, wherein a rear end of the movable diffuser section is connected to a translation section, a front end of the translation section is hinged to the rear end of the movable diffuser section, and a rear end of the translation section is limited by a translation limiting groove extending forward and backward.

8. The supersonic inlet according to claim 2, wherein a cowl lip sliding groove is provided on an inner side of the rotatable cowl section, and an end of the cowl lip support rod connected to the rotatable cowl section is provided with a cowl lip slider located in the cowl lip sliding groove.

* * * * *